US007818249B2

(12) United States Patent
Lovejoy et al.

(10) Patent No.: US 7,818,249 B2
(45) Date of Patent: Oct. 19, 2010

(54) OBJECT-ORIENTED METHOD, SYSTEM AND MEDIUM FOR RISK MANAGEMENT BY CREATING INTER-DEPENDENCY BETWEEN OBJECTS, CRITERIA AND METRICS

(75) Inventors: Kristin Gallina Lovejoy, Manassas, VA (US); Patrick Ivo Cross, Herndon, VA (US); Peter S. Tippett, Great Falls, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1958 days.

(21) Appl. No.: 10/032,610

(22) Filed: Jan. 2, 2002

(65) Prior Publication Data

US 2002/0138416 A1    Sep. 26, 2002

Related U.S. Application Data

(60) Provisional application No. 60/258,877, filed on Jan. 2, 2001.

(51) Int. Cl.
*G06Q 40/00* (2006.01)
(52) U.S. Cl. ........................... 705/38; 705/28
(58) Field of Classification Search .................. 705/38, 705/36 R, 7, 39, 22
See application file for complete search history.

(56) References Cited

U.S. PATENT DOCUMENTS

| | | | |
|---|---|---|---|
| 5,621,889 | A | 4/1997 | Lermuzeaux et al. |
| 6,266,655 | B1 * | 7/2001 | Kalyan ........................ 705/400 |
| 2002/0091699 | A1 * | 7/2002 | Norton et al. ................. 707/10 |

FOREIGN PATENT DOCUMENTS

WO    WO 00/75819    12/2000

OTHER PUBLICATIONS

Business Wire (Tangram's Asset Insight provides IT asset tracking. p. 4161313, Apr. 16, 1996).*
FDIC. Dec. 19, 1997. "Risk Assessment Tools and Practices for Information System Security." Supplement to Financial Institution Letter 131-97: "Security Risks Associated With the Internet."
Fisher, David A. and Howard F. Lipson, Jan. 1999. "Emergent Algorithms: A New Method of Enhancing Survivability in Unbounded Systems." Published in the Proceedings of the Hawaii International Conference on System Sciences. IEEE: Maui, Hawaii.

* cited by examiner

*Primary Examiner*—Ojo O Oyebisi

(57) ABSTRACT

A method, system, and medium for assessing and/or managing risks for an organization is described. The method, for example, comprises the steps of inventorying a number of assets of the organization, identifying at least one criterion defining a security objective of the organization, and identifying one or more inventoried assets that relate to the identified criterion. The assets may include one or more computers, networking equipment therefor and physical locations where the computers and networking equipment are located. The method may also include the step of formulating one or more metric equations, each metric equation being defined, in part, by the one or more identified assets. Each metric equation yields an outcome value when one or more measurements are made relating to the identified assets. The method may also include the step of assessing the risk to the organization based on the measured values of the one or more metric equations. Corresponding system, medium and means are also described.

29 Claims, 4 Drawing Sheets

OBJECT-ORIENTED METHOD, SYSTEM AND MEDIUM FOR RISK MANAGEMENT BY CREATING INTER-DEPENDENCY BETWEEN OBJECTS, CRITERIA AND METRICS

RELATED APPLICATIONS

This application claims priority to U.S. Provisional Application No. 60/258,877, which was filed on Jan. 2, 2001, which is incorporated herein by reference in its entirety.

FIELD OF THE INVENTION

The present invention relates to the field of risk management. In particular, a risk managing system is developed based on associations among inventoried assets, security management objectives and compliance requirements therefor.

BACKGROUND OF THE INVENTION

While it is reasonable to accept that an organization's interest in risk management is proportional to its perception of risk and threats, it is likewise reasonable to accept that in today's electronically inter-connected environment, any organization offering goods and/or services over a digital network is under increasing pressure from customers, partners, and/or regulating authorities to reduce risk and provide a secure infrastructure. Risk management can be defined as a process for identification, analysis, control and communication of risks. Nowadays, the process of risk management is a much more complex and evolving challenge than it was only twenty years ago. For example, in the past, most computers were kept in locked rooms and managed by personnel who ensured that the computers were carefully managed and physically secured. Network links to outside the physical boundary of the organization were unusual. Threats were well understood and risks were mitigated using traditional approaches (for example, locked doors, trained personnel, and accounting for resources). The nature of threats is much different today. Network architecture vulnerabilities, heterogeneous operating environments, configuration intensive software, a shortage or trained personnel, the rapid growth in the number of Internet connected devices, and the rapid growth in the number of Internet users represent only a few of the challenges facing today's organizations.

Regardless of changes in the nature of the threat, the use of a risk-management methodology continues to allow an organization to make informed decisions about the allocation of scarce resources to areas that are most at risk to reduce the risk. Risk management is an ongoing activity that includes phases for assessing risk, implementing controls, and monitoring effectiveness.

Risk assessment is widely used in both the public and private sectors to support decision-making processes. Risk assessment is also widely used in support of regulatory requirements. Traditionally, risk assessment is a process for tying together information gathered about assets, their economic values and their associated vulnerabilities. The sum of this effort is to produce a measure of the risk to the organization with respect to a given project, product, system, or service.

Of the many risk-assessment methodologies employed, the most common is an ad hoc methodology (e.g., someone believes a risk exists and addresses that risk). While this form of qualitative risk assessment is acceptable for small organizations, it is not appropriate or effective for larger organizations. In fact, by addressing one type of risk, larger organizations may introduce new vulnerabilities into other parts of its heterogeneous network electronic environment. Other conventional methods of risk assessment include the following:

Failure Mode and Effects Analysis: This method examines each potential failure condition in a system to determine the severity of the failure's impact to the system.

HAZOP (Hazard and Operability): This method examines process and engineering intentions to assess the potential hazards that can arise from deviations from design specifications.

Historical Analysis: This method examines frequency of past incidents to determine the probability of a condition recurring.

Human-Error Analysis: This method examines the possible impact of human intervention and error on a system.

Probabilistic Risk Assessment: This method examines the probability that a combination of events may lead to a particular condition.

Tree Analysis: This is a family of analysis methods, such as event tree attack tree, management-oversight tree and fault tree. This family of methods focuses on processes or a sequence of events that may lead to a particular condition.

Regardless of which risk assessment methodology is chosen, the assessment and management of risk traditionally follow a multi-phase approach, the underpinning of which is the selection of "best" or "essential" practices that represent management objectives. The following is a list of various phases used in conventional risk assessment methods:

1. Inventory and definition. In order to measure the theoretical impact of a risk, the organization determines its assets (e.g., electronic devices, electronically stored data, etc.) that are involved in support of critical processes. Once assets have been identified, a value is assigned to each asset. This value is not only monetary, but also may be tied to loss of reputation or loss of trust.

There are a number of conventional automated tools which can assist the organization in accomplishing this phase of the process. These tools, including Openview (manufactured by Hewlett-Packard Co. of Palo Alto, Calif.) and Visio® Enterprise (manufactured by Microsoft Corp. of Redmond, Wash.), are able to map network systems and devices and produce reports showing OS (operating system) type, revision level and the services that a system is making available to a network.

2. Vulnerability and threat evaluation. In this phase, the organization is examined for weaknesses that could be exploited by an unauthorized outsider, and the chances of an outsider attacking those weaknesses. Vulnerability and threat assessment is typically performed by an internal audit department or third party auditor using a set of assessment criteria. Criteria represent a standard of practice which should be met in order to assure effective security. Auditors use criteria to evaluate if vulnerabilities exist within the target of evaluation and whether, in phase three, if countermeasures exist to mitigate the vulnerability. Some forms of assessment criteria, like Common Criteria (set forth by Decisive Analytics of Arlington, Va.) and Orange Book (set forth by the U.S. Department of Defense in "Trusted Computer System Evaluation Criteria"), proactively delineate a methodology for building and implementing trust within systems as well as a methodology for assessing compliance. Other sets of assessment criteria, like COBIT (set forth by the Information Systems Audit and Control Foundation) and SAS 70 (set forth by the U.S.

Security and Exchange Commission) are more reactive in nature, used primarily for assessment purposes only.

Once a list of vulnerabilities has been delineated, each type of vulnerability is ranked according to the probability that it could be exploited by an unauthorized outsider. This probability is the threat associated with vulnerability. Methods for determining threat level abound and can be as simple as arbitrarily associating a value to the threat based on the frequency of the threat reported by such organizations as CERT (a center of Internet security expertise at the Software Engineering Institute), SANS (System Administration, Networking, and Security Institute), or the FBI (U.S. Federal Bureau of Investigation). The combination of vulnerabilities and threats provides the level of inherent risk, or the risk that exists in the absence of any control measures.

There are a number of tools available to electronically scan electronic devices and assess vulnerabilities within electronic devices. While tools of this nature are useful in identifying top vulnerabilities related to platform and/or service configurations, the tools cannot identify vulnerabilities within platforms or services not visible to the scan. Furthermore, these tools do not permit the user to create relationships between the asset at risk and its environment (i.e., other devices to which the asset connects, the physical location in which a device resides, or the network on which it participates.) Without the creation of these relationships, it is ineffective in properly measuring the impact of a risk or appropriately choosing effective controls.

3. Evaluation of countermeasures. Phases one and two represent the framework for risk assessment. Phases three, four and five provide the link between risk assessment and a more comprehensive risk management strategy. Starting with this particular countermeasure phase, a security practitioner determines whether or not countermeasures exist to mitigate the risk identified and quantified during phases one and two.

Countermeasures, commonly referred to as controls, are implemented in order to reduce risk to levels acceptable to the organization. The implementation of a countermeasure is traditionally a risk/value proposition. In addition to the costs associated with acquisition or implementation, there are also costs associated with usability, scalability, operations and maintenance. All these costs are considered when balancing cost of controls versus inherent risk. Note that there is always a measure of residual risk because of imperfections in the countermeasure that are available.

Evaluation of countermeasures is typically carried out by an evaluator (e.g., an internal audit department often in cooperation with a third party assessor). As in phase two, using sets of criteria defined by regulatory or standard bodies (e.g., BS7799, COBIT, SAS70, HIPAA), the evaluator chooses countermeasures which apply to the particular environment and then weigh their effectiveness.

This particular phase is an extremely time-intensive, labor-intensive, subjective process. Often countermeasures themselves have limited effectiveness but are chosen because they seem to be an easy, cost-effective alternative. In fact, the choice often fails to take into consideration downstream impact of the countermeasure implementation or other hidden costs.

4. Decision. Once risk has been assessed and identified, the organization can choose to accept the risk, mitigate the risk, or transfer the risk. This phase of the process allows an organization to evaluate the cost of the countermeasure versus the value of the asset to be protected by the countermeasure.

As with phase 3, this phase is extremely time-intensive, labor-intensive, and subjective. Often the decision fails to take into account ramifications of the choice in the context of other assets within the environment.

5. Ongoing Monitoring. Ongoing monitoring is an element of the risk management methodology. First, because implementation of controls may introduce risk in another area of the organization, it is desirable to monitor the effect of the implementation. Second, over time, the risk assessment itself loses relevancy because of changes in threats, or deterioration in the effectiveness of the control. Third, as the organization introduces new systems, services, and/or clients, the organization introduces new vulnerabilities into its electronic network environment.

There are currently a number of organizations, for example, Internet Security Systems, Inc. of Atlanta, Ga., Security Focus Inc. of San Mateo, Calif., and Trusecure, Inc. of Herndon, Va., that provide a monitoring service. While these services are effective in providing real time threat intelligence regarding electronic vulnerabilities to their client, these services cannot provide accurate monitoring in the context of other systems and services to which the target asset may be linked.

Notwithstanding the above-described conventional systems, no single methodology or software product includes the functionality necessary to automate risk management. While different conventional methods (example products of which have been mentioned above) may perform one or more of the phases of the process, such as inventory or electronic vulnerability analysis, no conventional method is capable of, among others, supporting all elements of a comprehensive risk management program.

SUMMARY OF THE INVENTION

Embodiments of the present invention provide a method, system and medium embodiments for automatically supporting all phases of a traditional risk management program, regardless of the risk assessment model chosen by a security practitioner.

For example, embodiments of the present invention provide a method for assessing and/or managing risks for an organization. The method can include the step of inventorying a plurality of assets of the organization. Each asset can be defined to be one of an electronic asset type and a location asset type, and the electronic asset type includes computers and networking equipment therefor and the location asset type includes physical locations where the electronic asset types are placed. The method can also include the steps of identifying at least one criterion defining a security objective of the organization, identifying one or more inventoried assets that relate to the identified criterion, and formulating one or more metric equations for each identified criterion, each metric equation being defined, in part, by the one or more identified assets. Each metric equation yields an outcome value when one or more measurements are made relating to the identified assets. The method can also include the step of assessing the risk to the organization based on the measured values of the one or more metric equations.

The step of inventorying can include the step of identifying the plurality of assets and storing the identified assets into a database. The step of identifying the plurality of assets can include at least one step of electronically scanning the plurality of assets, interviewing members of the organization to identify the plurality of assets and manually identifying the plurality of assets.

In the method, the plurality of assets can also be defined to be one of a user type, a user population type, a data type and a network type in addition to the electronic type and the location type. The user type relates to an individual user, and the user population type relates to a group of users.

The method can further include the step of establishing at least one relationship between the plurality of assets. The step of establishing the at least one relationship also include the step of linking a first asset define to be in one asset type with a second asset defined to be in another asset type, and/or linking a first asset define to be in one asset type with a second asset defined to be in the same asset type.

In addition, the step of identifying one or more inventoried assets can include the step of identifying one or more inventoried assets that relate to the identified criterion based on the at least one established relationship between the plurality of assets.

Embodiments of the present invention also provide a system for assessing and/or managing risks for an organization. The system can include means for identifying and storing a plurality of assets of the organization. Each asset is defined to be one of an electronic asset type and a location asset type, and the electronic asset type includes computers and networking equipment therefor and the location asset type includes physical locations where the electronic asset types are placed. The system can also include means for identifying a plurality of criteria, each criterion defining a security objective of the organization, means for identifying a plurality of inventoried assets that relate to each identified criterion, and means for formulating one or more metric equations for each identified criterion, each metric equation being defined, in part, by the one or more identified assets. Each metric equation yields an outcome value when one or more measurements are made relating to the identified assets, thereby allowing a user to assess the risk to the organization based on the measured values of the one or more metric equations.

The inventorying means can also include means for identifying the plurality of assets and storing the identified assets into a database. The means for identifying the plurality of assets can comprise at least one of means for electronically scanning the plurality of assets, means for interviewing members of the organization to identify the plurality of assets, and means for manually identifying the plurality of assets.

In the system, the plurality of assets can be defined to be one of a user type, a user population type, a data type and a network type in addition to the electronic type and the location type. The user type relates to an individual user, and the user population type relates to a group of users.

The system can also include means for establishing at least one relationship between the plurality of assets. The means for establishing the at least one relationship can further comprise means for linking a first asset define to be in one asset type with a second asset defined to be in another asset type, and/or means for linking a first asset define to be in one asset type with a second asset defined to be in the same asset type. In the system, the identifying means can further comprise means for identifying one or more inventoried assets that relate to the identified criterion based on the at least one established relationship between the plurality of assets.

Embodiments of the present invention provides another system for assessing and/or managing risks for an organization. The system can include a computer configured to identify a plurality of assets of the organization. Each asset is defined to be one of an electronic asset type and a location asset type, and the electronic asset type includes computers and networking equipment therefor and the location asset type includes physical locations where the electronic asset types are placed. The system can also include a database configured to store the identified assets along with their asset types and means for identifying at least one criterion defining a security objective of the organization. The computer can be further configured to identify one or more inventoried assets that relate to the identified criterion and configured to formulate one or more metric equations for each identified criterion, each metric equation being defined, in part, by the one or more identified assets. Each metric equation yields an outcome value when one or more measurements are made relating to the identified assets, thereby allowing a user to assess the risk to the organization based on the measured values of the one or more metric equations.

The computer of the system can also be configured to electronically scan the plurality of assets, interview members of the organization to identify the plurality of assets, and/or manually identify the plurality of assets. In the computer, the plurality of assets can be defined to be one of a user type, a user population type, a data type and a network type in addition to the electronic type and the location type. The user type relates to an individual user, and the user population type relates to a group of users.

The computer of the system can also be configured to establish at least one relationship between the plurality of assets. The computer can also be further configured to link a first asset defined to be in one asset type with a second asset defined to be in another asset type and/or to link a first asset defined to be in one asset type with a second asset defined to be in the same asset type. The computer can further be configured to identify one or more inventoried assets that relate to the identified criterion based on the at least one established relationship between the plurality of assets.

Embodiments of the present invention also provide a computer readable medium including instructions being executed by one or more computers, the instructions instructing the one or more computers for assessing and/or managing risks for an organization. The instructions can comprise implementation of the step of inventorying a plurality of assets of the organization. Each asset is defined to be one of an electronic asset type and a location asset type, and the electronic asset type includes computers and networking equipment therefor and the location asset type includes physical locations where the electronic asset types are placed. The instructions can also include the implementations steps of identifying at least one criterion defining a security objective of the organization, identifying one or more inventoried assets that relate to the identified criterion, and formulating one or more metric equations for each identified criterion, each metric equation being defined, in part, by the one or more identified assets. Each metric equation yields an outcome value when one or more measurements are made relating to the identified assets, thereby allowing a user to assess the risk to the organization based on the measured values of the one or more metric equations.

The instructions of the medium can also include the implementation step of identifying the plurality of assets and storing the identified assets into a database. The step of identifying the plurality of assets can include at least one of electronically scanning the plurality of assets, interviewing members of the organization to identify the plurality of assets, and manually identifying the plurality of assets.

The plurality of assets can be defined to be one of a user type, a user population type, a data type and a network type in addition to the electronic type and the location type. The user type relates to an individual user, and the user population type relates to a group of users. The instructions of the medium can also include the implementation step of establishing at least one relationship between the plurality of assets. The step of establishing the at least one relationship can further comprise the step of linking a first asset define to be in one asset type with a second asset defined to be in another asset type and/or linking a first asset define to be in one asset type with a second asset defined to be in the same asset type.

The instructions of the medium can also include the implementation step of identifying one or more inventoried assets that relate to the identified criterion based on the at least one established relationship between the plurality of assets.

BRIEF DESCRIPTION OF DRAWINGS

The detailed description of embodiments of the present invention showing distinctive features over conventional risk management methods may be best understood when the detailed description is read in reference to the appended drawing in which:

FIGS. 1-2 have been created using UML (Unified Modeling Language) conventions. Each of the boxes represents a "type," or class. In the actual implementation there may be many instances of each type. As an example, there is a class called Device used to represent hardware devices (computers, firewalls, routers, telephone switches, etc.). An organization may have one device instance which represents their Web server, another for their firewall, and another for their e-mail server.

Each class has a name listed in the upper third of the box, and a set of properties listed in the middle third of the box. All of the diagrams included in the example have only the properties required to describe embodiments of the present invention—an actual implementation can have many more.

Figure 1:
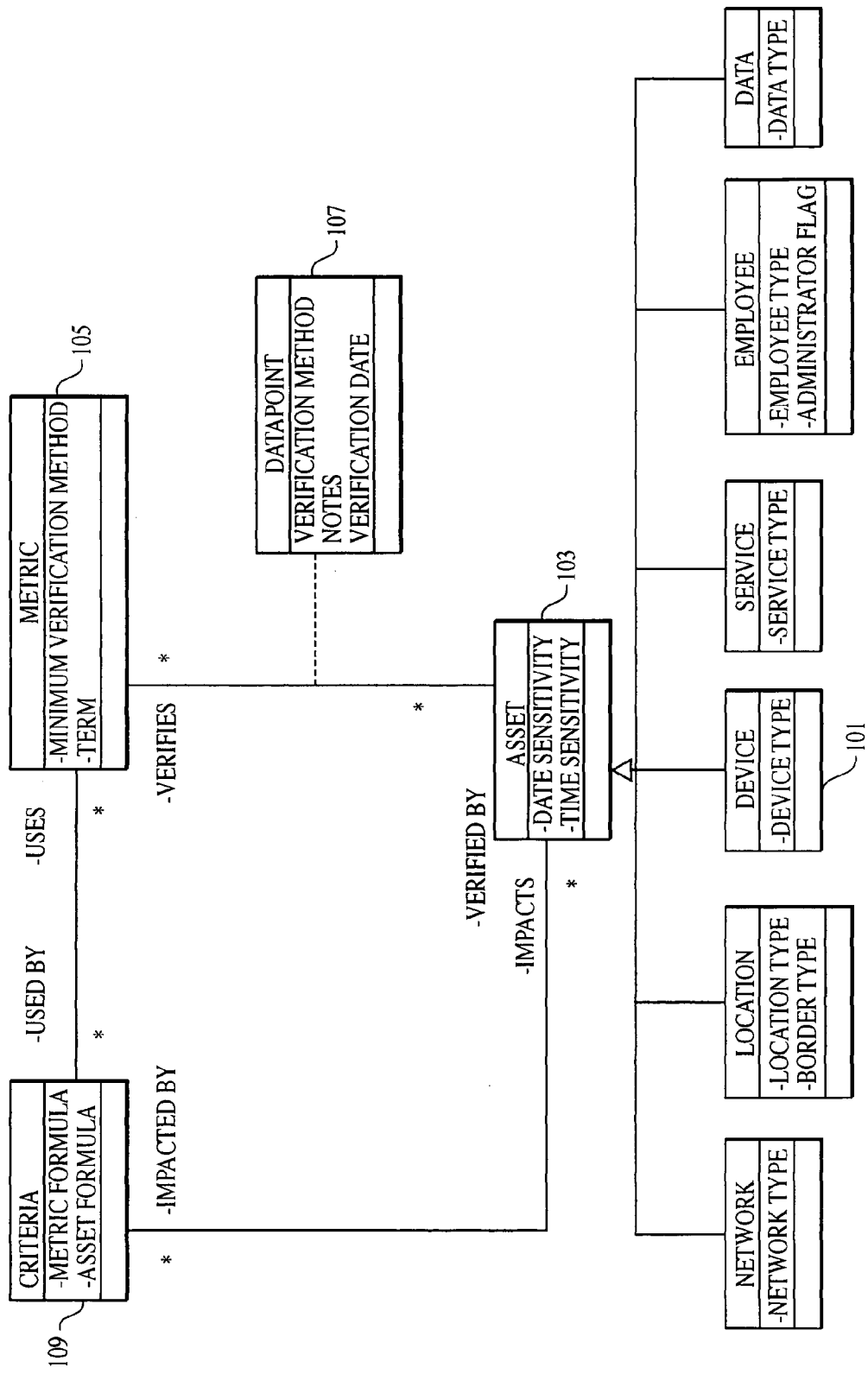
FIG. 1 is a UML Diagram of a Simplified Model of Criteria and Assets of embodiments of the present invention.

The lines are used to represent relationships and generalization. The lines that end with a large arrow (like the one from Device to Asset in FIG. 1) are used to describe generalization. Generalization implies that one class inherits all of the properties, methods, and relationships of the other. In FIG. 1, Device 101 is inheriting from Asset 103, and thus also has a relationship to Metric 105. On the relationship lines are labels describing the relationships from each direction, appearing near the boxes at each end of the line. Cardinality is also shown, as either 1 or *. One (1) means that an instance can only attach to one other item, and * means each instance can attach to any number of other items. As an example, in FIG. 2 a Device can only be Located In 201 one Location 203, and a Location can Contain 205 any number of Devices.

There is also a special kind of relationship that combines a relationship and a class that is called an association class. In FIG. 1 this is shown as DataPoint 107, as a class attached to a relationship line via a dashed line. It describes a relationship that also has a class with the relationship. This allows the storing of properties on the relationship, as denoted by the properties of the class attached to the relationship.

DESCRIPTION OF THE EMBODIMENTS

As a high-level description of embodiments of the present invention, a body of "best" or "essential" practices (referred to as "criteria" hereinafter) that represents security objectives of an organization is first identified. Each identified criterion is then mapped to an asset formula that includes one or more asset functions. The mapping of each criterion to asset formula allows customized criteria and compliance requirements (i.e., metrics) to be generated based on inventory of assets stored in a database. The inventory of assets stored in the database can be created before, after and/or concurrently with the steps of identifying and mapping of criteria. The above described steps and terms are described below starting with the creation of the asset inventory.

The step of inventorying assets of the organization can be conducted by a user, or a group of users. The user can be an auditor, assessor, security practitioner, system administrator and/or any combination thereof. Within the organization, assets may include critical as well as non-critical assets (e.g., computers, networking equipment, database, etc. or anything else that can be benefited from risk management) that can be inventoried (i.e., identified and stored into the database). In another embodiment, only critical assets may be inventoried. A critical asset is an asset that makes other assets of the organization vulnerable to security breaches when its countermeasure fails. As for the database, it can be implemented, for example, in any relational database (e.g., database engines manufactured by Sybase Inc. of Emeryville, Calif.).

The inventory can be optionally performed by using an electronic scan(s) and/or interview(s) with members of the organization. The purpose of the electronic scan is to permit a rapid inventory of device assets. Other assets, including non-electronic data, networks, users, locations, and user populations may be inventoried through the interview(s).

While any electronic scan or inventory (including a manually prepared inventory) of critical electronic devices may suffice, the user can optionally use both an active port scan as well as a passive packet sniffer to inventory electronic devices. The port scan is a scan within each segment of the organization's network. The port scan returns, for example, a list of IP (Internet Protocol) based devices, operating systems hosted on the devices, and services offered by the device. A packet sniffer is a set of computer instructions to perform, for example, one or any combination of the following functions: 1. Listen to all TCP/IP (Transmission Control Protocol/Internet Protocol) traffic on a subnet; 2. Intercept all outgoing requests for Web documents; 3. Intercept all incoming requests for Web documents; and 4. Decode basic authentication passwords, if any. In particular, the passive packet sniffer can be a scan within each network segment. This packet scanner is used not only to validate the data returned from the port scan, but is also used for the purpose of analyzing network traffic patterns and identifying hosts which may not have been visible to the port scan, for example, hosts participating on an IPX/SPX (Internet Packet eXchange/Sequenced Packet eXchange) network. Devices electronically discovered during the scans are populated within a database.

Another method of creating the inventory can optionally include uploading an inventory list generated by inventory list creating software packages (e.g., Openview manufactured by Hewlett Packard Co. or System Management Server, SMS, manufactured by Microsoft Corp.). The user can optionally also upload an inventory list that was generated by hand and stored in a text file.

During interviews, the user may ask members of the organization (e.g., a manager or system administrator) to identify assets that they perceive as relevant and/or critical to security of the organization's computer networks and to select the control objectives which best represent the member's objectives in securing those assets.

In addition to the interviews, relationships between the identified assets and other assets within the organization may be captured. For instance, an electronic asset can be linked to a location in which the electronic assets reside, network(s) on which the asset participates, user groups who use the asset, and an administrator who manages the asset. This linking process is described below.

Optionally, the inventoried assets of the organization may be classified as critical assets based on other parameters, such as the locations of the assets on the network (e.g., visible or accessible via the Internet), based on services or applications that particular assets are hosting, and/or based on the amount of traffic that the assets support. It should be noted that while an asset may not be recognized as critical by a manager or administrator, its relationship to other assets within the organization may introduce vulnerability, and therefore it can be identified as critical.

As assets are inventoried, their attributes can be ascertained. For example, electronic assets can be time critical and/or data sensitive devices. Typical examples of time critical devices include switches, routers, hubs, or other filtering devices whose availability is protected. Data sensitive devices include those devices which if confidentiality, privacy, or integrity of the data were compromised would cause a loss to the organization. In order to meaningfully arrange attributes of various assets, each asset is associated with a risk profile that includes multiple levels of sensitivity, which may be modified or incremented. For example, the profile of an electronic asset may be defined not only as time critical and/or data sensitive, but with multiple levels of sensitivity. For instance, a server may have a high level data sensitivity but a low level time sensitivity, while a router may have a high level time sensitivity but a low level data sensitivity. In another example, one server may have an average level of sensitivity while another may have a high level of data sensitivity.

Non-electronic assets can also be inventoried within the database with a profile. For instance, a location profile may be: 1) "Outside"; 2) "Untrusted" which means that members of the public have access to the location; 3) "Semi-Trusted" wherein members of the public have limited accesses to the location; 4) or, "Trusted" wherein members of public have extremely limited accesses. Once again the profiles associated with the locations are modifiable and represent characteristics of the location. By allowing objects like locations to be attributed with a profile, embodiments of the present invention can optionally be configured to illustrate to the user the inherent flaws within the existing security architecture. For instance, if a critical device is linked to an untrusted location, it is possible for the user to easily recognize the physical security enhancements need to be made to that location.

In addition to locations which can have a risk profile, other assets within an organization may include network equipment. Network assets may be: 0) "Outside" (e.g., the Internet); 1) "Untrusted," or accessible from an outside network; 2) "semi-trusted" or accessible by a third party client or a vendor; 3) "trusted" or accessible only by internal of the organization.

In addition to electronic assets, networks and locations, a fourth type of object is the user population. The user population represents a group of users that has been granted to assess a particular piece of data or a particular device. Embodiments of the present invention may include six or more different object classes or user population classes: 1) an "untrusted" user population (e.g., an anonymous Internet user); 2) a "semi-trusted outside" user may be a user coming from an outside source (e.g., somebody not internal to the organization that has an account on the system); 3) a "semi-trusted inside" user (e.g., a third-party consultant or a temporary worker within the organization); 4) a "trusted outside" employee who may intermittently connect to a network, i.e., using dial up lines; 5) a "SOHO" (small office home office) employees who utilize a persistent means to connect to a network, (i.e., using DSL); 6) a "trusted inside" employee who connects to the network internally.

The following represents an example collection of non-electronic assets.

Network:
Network Data can be gathered in the following format:
Label, Trust Value (0-3), IP address range
Example:
    DMZ, 1, 132.150.2.0/254
    Intranet, 3, 172.16.0.0-172.16.255.254
0 (External) A completely external network with null trust. This represents the Internet.
1 (Untrusted) A network which borders the Internet. Typically this network is labeled the DMZ, or Production Network.
2 (Semi-Trusted) A private network which borders an untrusted network. Typically this network is labeled the Extranet.
3 (Trusted) A trusted, internal network. This would be typically labeled as the Intranet.

Locations:
Location data can be gathered in the following format:
Location Label, Trust Value (0-3), Border Trust Values
    Example:
        Lobby, 1, 0 and 2
        Development Office Area, 2, 1 and 3
0 (External) A completely external location with null trust. This represents any area outside the organization's business perimeter (the "environment") and is typically labeled "outside."
1 (Untrusted) An untrusted room within the environment to which the public has access. Untrusted rooms can include the lobby and the delivery loading dock.
2 (Semi-Trusted) A private room within the environment in which employees tend to work. Typically this network is labeled the "Office Area."
3 (Trusted) A trusted, internal location in which sensitive devices and/or data are maintained. This would be typically labeled as the Data Center.

User Population:
User population data can be gathered in the following format:
User Population Label, Trust Value (0-3)
    Example:
        Anonymous Internet Users, 0
        E-com clients, 1
0 (Untrusted) A completely untrusted user with null trust. This represents the any non-authenticated Internet browser.
1 (Semi-Trusted Outside) A semi-trusted user is an outside or third party user with minimum trust (i.e., an account) on a system within the organization. An outside user would have access to the assets of the organization from outside the local network of the organization.
2 (Semi-Trusted Inside) A semi-trusted user is an outside or third party user with minimum trust (i.e., an account) on the assets of the organization. An inside user would have access to the assets of the organization from inside the local network.
3 (Trusted Outside) A trusted employee accessing the assets of the organization externally over an intermittent connection (via dial-up or over the Internet)
4 (Trusted Outside) A trusted employee accessing the assets of the organization externally via a persistent connection (e.g., via DSL, Digital Subscriber Line)
5 (Trusted Inside) A trusted employee accessing the assets of the organization internally (via the local LAN, Local Area Network)

Users:
Key user data can be gathered in the following format:
User name, Role, Employment Status
    Example:
        Kristin Lovejoy, Administrator, Employee
        John Smith, Administrator, Third Party
ROLE A user can have one of three roles: Administrator, Manager, Employee.
STATUS A user can be either a first party employee or third party (for example, contractor, consultant).

Data:
Sensitive data can be gathered in the following format:
Data Type, Classification
    Example:
        Payroll Database Output, Confidential
TYPE Data can have many types, including: Paper.
STATUS Data can have one of the following modifiable classifications: public, confidential, secret, top secret.

It should be noted that there are an unlimited number of asset types which can be defined within embodiments of the present invention. While only the use of devices, locations, networks, user populations, users, and data as asset classes has been described, anything that could be classified and/or profiled would be acceptable as a type of asset within embodiments of the present invention.

The identified assets are stored into, updated in and/or retrieved from the database in the context of object oriented programming. Accordingly, each defined asset falls into an "asset class," which is akin to a parent object in the parlance of object oriented programming, and is attributed with a risk. For example, the asset type "location," may include multiple iterations of child assets such as "untrusted location," "semi-trusted location," "trusted location" which would be labeled with a user friendly appellation, such as "lobby," "Development Space," and "Data Center," respectively.

Referring back to the high-level description of embodiments of the present invention, the step of mapping each criterion to an asset formula is described below which illustrates an example criterion being mapped into an asset formula.

CRITERION: Data to be logged should include the remote host name and address, the method used for host and user authentication, time of connection start and end, connection status.
ASSET FORMULA: &asset_type('device'): * [&data_sensitivity(1): +time_sensitivity(1):]* admin_type(Remote, Third Party):
INTERPRETATION: The criterion iterated above may be returned by the database if the organization to be assessed has a device with a data sensitivity (privacy, confidentiality and integrity of data are protected) of 1 or higher and/or a time sensitivity (availability of the device is protected) of 1 or more, and is being administered remotely by a third party (contractor/consultant).

As shown in the above example, each criterion is mapped to at least one asset formula. In turn, each asset formula comprises one or more asset functions that can be mapped to the inventoried assets. The criteria that have been mapped to the inventoried assets via corresponding asset formula and asset function(s) are referred as customized criteria. In other words, once asset inventory is created for an organization, it can be used in creating customized criteria in managing risk and addressing specific security objectives of the organization.

In addition to the mapping of each criterion to an asset formula, each criterion can optionally be mapped to a metric or metrics which represent compliance with the criterion as well as minimum verification method. For example, an example criterion may require that "Visitors are escorted within this location at all times or are asked to wear numbered badges." Such a criterion can be linked with the following metric formula: "?Visitor Escort: +?Numbered Badges:" (Interpretation: Visitor escort OR Numbered badges). The minimum verification method associated with each metric would be "Inspect." The minimum verification serves to guide the user on the appropriate method by which to assess compliance with the criterion. Each metric may be further associated with the following values: An implementation cost; a risk mitigation value. Examples of asset formulas, functions and metrics are provided below in connection with FIGS. 1-2.

The above described steps are advantageously carried out by, among others, a set of graphical user interfaces (the "user interface"). The user interface is configured to link the inventoried assets together to form relationships there between, which eventually turns into asset formulas. In particular, the user interface allows the user to view and relate assets within their environment, including data, locations or rooms within the organization, the user-populations who are using their services, their assets, etc. as well as administrators or individuals within their organizations. The user interface can optionally be implemented using a Web interface created using HTML (Hyper Text Markup Language).

The user interface is also configured to allow the user to modify values, sensitivities and profiles of the inventoried assets as well. The user interface also allows the user to create and review criteria based on the asset functions. And, as the asset inventory changes, the user interface is configured to show the effect of the change throughout the organization. Each asset may also be associated with a cost using the user interface. For instance, a router may be associated with a replacement cost.

Through the user interface, the user then creates horizontal and vertical relationships between objects. For example, a "Web server" asset can be contained by a "Data Center" asset whereas the "Web server service" may be administered by a "$3^{rd}$ Party Administrator" user population. These relationships between assets are asset formulas.

Using the above-described user interface, network and location objects can be defined with a border property. The association of border properties provides an effective development of an asset function. While the capacity to associate a criterion that a location is physically secured if the room contains a critical asset is effective, it is more effective to be capable of associating criteria not simply to the location, but to its doors as well. For example, a Data Center may have both a fire exit door to the outside as well as a border to a semi-trusted area. Each of these borders, or doors, requires a different form of security control to protect the location. In this instance, there may be a requirement that the door to the outside be available for egress only whereas the door from the semi-trusted area is locked and monitored. The requirement for physical security may change in this instance if more critical assets were moved out of the location. In sum, at least some embodiments of the present invention allow to capture the relationships not only between different asset types (e.g., a device and a network) but also between assets of the same type (e.g., a network to a network or a network to multiple networks and/or location-to-location or location to multiple locations).

In addition, by associating user populations to devices or data assets, it is possible to control, track policy, procedure development and compliance more effectively. An example is to link an untrusted user population with a device asset which hosts a Web Server service. By linking the three (user population, device and service), it is possible to apply a criterion to the device which states that the Web Server service prominently displays an online privacy policy. The online privacy policy protects the consumer from potential breaches of privacy and legal interests of the organization.

Another advantage provided by the user interface is that assets not identified as critical can be subsequently found to be critical. For example, while the manager or administrator may have identified a Web server and database as critical, they may have overlooked a supporting router, located in an unsecured wiring closet, as critical as well. In this model, the Web server and database would be linked to a user population and network. Because the Web server is used by Internet users (untrusted users), the network on which the device resides is likewise classified as untrusted. Because the network is an untrusted network, the border to the Internet is secured using a filtering router or firewall. Therefore, in this model, the router would be discovered and inventoried. Its relationships to networks, user groups, users, and locations would likewise be defined.

After linking the router with its location, the wiring closet, the user would be capable of determining that the Web server and database were at risk because the router which provides the device access to the Internet is not physically secured. The easiest means to inventorying these electronic assets is to electronically scan the environment through a combination of active and passive scanning, as described above, and to interpolate criticality based on traffic patterns and the services being offered by the devices.

The user can optionally upload criteria (i.e., essential practices) into the database to link those criteria or practices to the asset functions and to associate metric or measures of compliance with those particular criteria. In this model, a metric is a control plus the measure of that control. For instance, assume an asset function indicates that a critical device is located in a trusted room. Because of the relationship between the assets, a criterion requires that there must be a lock enabled on the door to the data center. In this instance, metrics within the database include a key lock, a cryptographic lock, a card key lock or a biometric scanning device. Each of these metrics has been linked to the criterion. By choosing one, the requirement is met. Embodiments of the present invention also have the ability to associate two values with each metric. The first value is an effectiveness value, or how effective the metric is in fulfilling the requirement. The second value is a metric cost, or the control, implementation, and support cost associated with the countermeasure. Using the previous example, a key lock is far less beneficial in mitigating risk than an electronic key card. Accordingly, a higher effectiveness value would be associated with the electronic key card as a metric, and a lower value associated to the key lock. The second value associated with the metric would be the cost of the control, its implementation and support. In the previous example, an electronic key card is much more expensive to implement and support than a key lock. Therefore, the electronic key card would be associated with a much higher cost. The cost of the metric could therefore be weighed against the effectiveness of the control, thus allowing the administrator or manager to more effectively allocate scarce resources in the most efficient manner.

Subsequent to inventorying assets and establishing relationships among them, security measures are implemented and evaluated within or around the inventoried assets. For example, if the availability and integrity of an Internet visible Web server and a database are identified as critical, then the location of the devices may likewise be identified and the controls implemented to reduce the risk of damage, destruction, or theft of the devices may be assessed. In this respect, the user examines the organization for weaknesses that could be exploited, and determines the chances of someone attacking any of those weaknesses. The combination of vulnerabilities and threats provides the level of inherent risk, or the risk that exists in the absence of any countermeasures. As in the conventional risk management approaches, embodiments of the present invention make use of the criteria in analyzing and quantifying vulnerabilities and threats. Unlike the conventional risk management approaches, however, embodiments of the present invention support the assessment of vulnerability within the context of the assets which have been inventoried and linked within an object-oriented database pursuant to the method and system outlined above.

It should be noted that in addition to assessing risk within the context of the asset functions defined within the database, embodiments of the present invention also differ from the conventional risk assessment approaches when analyzing electronic vulnerabilities. Traditionally, electronic vulnerabilities are typically defined using tools such as Scanner™ manufactured by ISS of Champaign, Ill. and Retina manufactured by eCompany LLC of Corona del Mar, Calif. Scan output includes the address and name of the vulnerable host, a high level description of the vulnerability, and a recommendation for mitigation of that vulnerability. Typically these vulnerabilities are ranked according to the probability that they could be exploited. This probability is the threat associated with vulnerability.

Within embodiments of the present invention, the existence of electronic vulnerabilities is used to indicate non-compliance with the specific practices selected by the user. This is achieved by loading vulnerabilities discovered through electronic scans into the database and linking the vulnerabilities with their respective devices as described above. Recommendations for mitigation of vulnerabilities typically take on one of four forms, among others: upgrading the software to the latest version, patching the software with the latest service pack or hotfix, implementing access control rights and privileges to protect critical files and directories, revising either the firewall rulebase or router access control list in support of the principle of least privilege. These recommendations typically represent "best" or "essential practices." By linking the vulnerabilities directly to the devices within the database, the vulnerabilities indicate non-compliance with the best or essential practices. Within this model, if vulnerability is discovered for which there is no direct criterion for mitigation, a new criterion is added to the database.

Now turning to describe metrics, a metric reflects not only the countermeasure but also the measurement of risk reduction through implementation of that specific countermeasure. In embodiments of the present invention, a metric can be a countermeasure which is associated with a implementation cost as well as a risk mitigation value. Unlike the conventional methods, the criteria used by the user in embodiments of the present invention may be specific to the organization, the derivation of which is based on assets which have been inventoried by the user, the set of criteria pre-defined within the database, asset formulas as defined within the user interface, as well as the results of the vulnerability and threat assessment. Pursuant to embodiments of the present invention, compliance or non-compliance with a criterion can be measured by choosing one or more metrics which have been pre-defined within the database and linked to the criterion as a requirement for risk mitigation.

The metrics defined within the database are also associated with a modifiable effectiveness value, as well as a cost. The cost is not simply the cost of the actual control, but can also reflect an implementation and support cost as well.

The set of defined metrics also allows security management choices. More specifically, by associating metrics with criteria, a user can view not only compliance with the criteria but a measurement of the cost and value of the metrics. In an example described above, a user could choose the metric "visitor escort" and review the implementation cost associated with the control (for example, salary and benefits for support personnel) as well as review the relative effectiveness of the control in achieving compliance. This could be contrasted with the implementation cost of the second metric, "numbered badges," and its risk mitigation value.

In embodiments of the present invention, compliance (True/False) is defined as a "datapoint" or intersection between the criterion and the metric. It should be noted that a "datapoint" represents not only compliance, but the method of compliance, for example, through attestation, demonstration, or testing. By allowing the user to analyze the implementation cost versus the risk mitigation value of choosing specific controls, embodiments of the present invention allow the user to more efficiently and effectively determine whether to accept, transfer or mitigate a particular risk. Embodiments of the present invention also allow the user to choose the most effective and least costly control appropriate to his or her specific environment.

The above described features can also be used for reverse engineering purposes through the definition of "what if" scenarios. As the organization and its inventory of assets change, assets inventoried within the database can be deleted and/or modified through the user interface (new assets can also be added). As the asset inventory changes, so do asset functions which drive the criteria applied to the organization. As cost, availability or effectiveness of countermeasures changes, new metrics mapped to criteria within the database can likewise be added, deleted, or revised. As new threats emerge, the results of repeated vulnerability assessments can likewise be loaded into the database and represent new criteria. The feature of allowing new criteria and/or metrics to be introduced represents the continued evolution of the risk management program.

Figure 2:
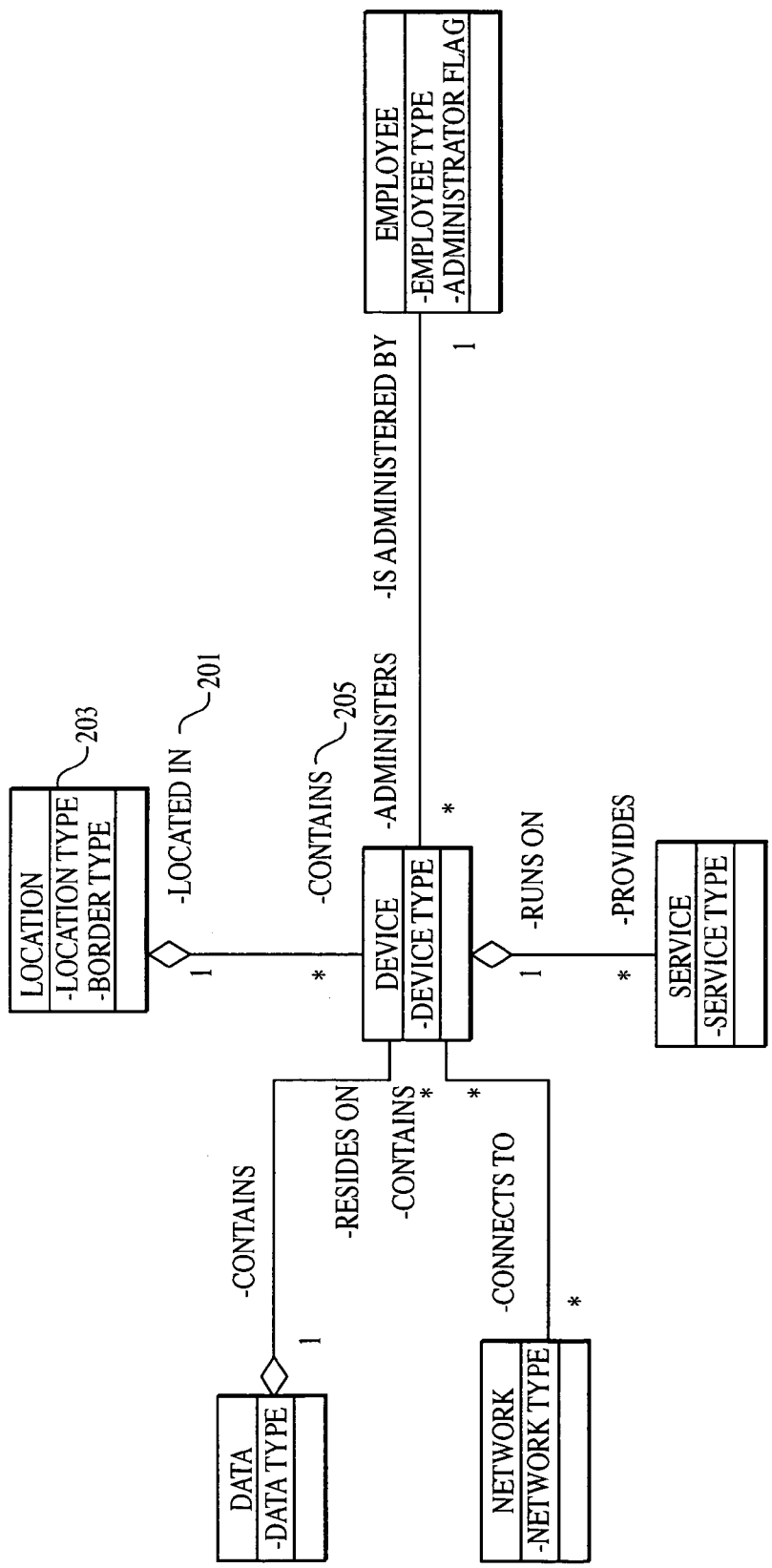
FIG. 2 is a UML Diagram of an Example Relationships among Assets of embodiments of the present invention.

The above described features are further embellished using examples illustrated in FIGS. 1-2. In order to determine if a criterion is satisfied, the first step is to determine if the metrics used by that criteria are met. Metrics 105 are specific items that can be measured to determine if they are true or not. As shown in FIG. 1, there is a relationship from Metric 105 to Asset 103, as well as one from Criteria 109 to Asset 103. The Impacted By/Impacts relationship from Criteria determines which assets need to be considered when determining if the Criteria is met.

Only certain assets impact a given criterion (and its associated metrics). For example, if a criterion requires that "physical access is secured," that criterion can obviously only apply to Location assets. To determine which assets impact a criterion, the Asset Formula property is used. This formula is a complex set of functions that are evaluated to determine if an asset impacts the criteria. Functions for Metric Formula section below illustrates an example set of asset functions and how they can be combined. The function name is shown in bold, and the parameters to the function are listed in the parentheses. Note that the specific syntax is an example implementation—any representation would suffice as long as it can be evaluated to true or false for one or more assets. Note that this formula is used to determine which assets impact the corresponding criterion—not whether the criterion is satisfied or not. The provided asset formulas also reference some of the relationships among the asset types. For example, the data sensitivity function can apply to a location, and its truth is determined based upon the data sensitivity of the devices contained within the location (the Contains/Located In relationship in FIG. 2). It should be noted that the illustrated Asset Formulas are not comprehensive.

Functions for Metric Formula

Functions
    all( )
    States that all of the items in the parentheses must be true.
    atleast(InNum, formula1, formula2, etc.)
    At least InNum of the listed items must be true for this function to be true.
    _ not(formula)
    Negates (reverses) the value of the included formula expression.
    asset_type(type)
    True if the class of the asset matches the listed type.
    sensitivity(data sensitivity, time sensitivity)
    True if the asset's data and time sensitivity are both equal to or greater than the supplied values.
    exact_sensitivity(data sensitivity, time sensitivity)
    True if the asset's data and time sensitivity are both equal to the supplied values.
    data_sensitivity(data sensitivity)
    True if the asset's data sensitivity is equal to or greater than the supplied value.
    time_sensitivity(time sensitivity)
    True if the asset's time sensitivity is equal to or greater than the supplied value.
    exact_data_sensitivity(data sensitivity)
    True if the asset's data sensitivity is equal to the supplied value.
    exact_time_sensitivity(time sensitivity)
    True if the asset's time sensitivity is equal to the supplied value.
    device_type(type)
    True if the device type property matches the supplied value.
    user_type(type)
    True if the employee type matches the supplied value.

Description of the Functions
    The following are the functions that are allowed in formula and information on how to use them.

all( )
    This function simple returns all of a customer's assets. It is meant to be used at the asset formula for policies or any other essential practice that should apply to everything.
    Example: &all( ):

atleast(target number, formula1, formula2, etc.)
    The atleast function takes in a target number and several formula elements(criteria, metrics, and functions) as parameters. A given asset only passes if it a number of the form elements greater than or equal to the target number. Note that the formula elements are preferably entered with the appropriate prefix and suffix characters. In fact, each of these elements are treated as its own formula so feel free to make the individual parameters as complex as you like.

Example:
&atleast(3, /crit1:, [/crit2: * /crit3:], &function(param1, param2):, [/crit3: * /crit5:]):

_not(formula)
The _not function represents the logical operator 'not'. It takes a formula as a parameter and returns the opposite of that formula.
Examples:
&_not(/crit1:):
&_not(/crit2: * /crit2: * /crit3:):

asset_type(type)
The asset_type function determines if an asset is of the entered type. The type is the only parameter and is case insensitive.
Examples:
&asset_type(Device):
&asset_type(network):
&asset_type(LOCATION):

sensitivity(data sensitivity, time sensitivity)
This function determines an asset's data and time sensitivity. The two parameters, data sensitivity and time sensitivity, are entered as numbers. It will return true for any asset whose sensitivity is equal to or greater than the entered sensitivity.
Examples:
&sensitivity(0,0):
&sensitivity(1, 2):

exact_sensitivity(data sensitivity, time sensitivity)
This function determines an asset's data and time sensitivity. The two parameters, data sensitivity and time sensitivity, are entered as numbers. It will return true for any asset whose sensitivity is equal to the entered sensitivity.
Examples:
&exact_sensitivity(1,1):
&exact_sensitivity(2,0):

data_sensitivity(data sensitivity)
This function determines an asset's data sensitivity. The parameter data sensitivity is entered as a number. The function will return true for any asset whose data sensitivity is equal to or greater than the entered sensitivity.
Examples:
&data_sensitivity(1):
&data sensitivity(2):

time_sensitivity(time sensitivity)
This function determines an asset's time sensitivity. The parameter time sensitivity is entered as a number. The function will return true for any asset whose time sensitivity is equal to or greater than the entered sensitivity.
Examples:
&time_sensitivity(1):
&time_sensitivity(2):

exact_data_sensitivity(data sensitivity)
This function determines an asset's data sensitivity. The parameter data sensitivity is entered as a number. The function will return true for any asset whose data sensitivity is equal to the entered sensitivity.
Examples:
&exact_data_sensitivity(1):
&exact_data_sensitivity(2):

exact_time_sensitivity(time sensitivity)
This function determines an asset's time sensitivity. The parameter time sensitivity is entered as a number. The function will return true for any asset whose time sensitivity is equal to or greater than the entered sensitivity.
Examples:
&exact_time_sensitivity(1):
&exact_time_sensitivity(2):

device_type(type)
This function determines the type of a device asset. The single parameter, type, is entered as a text string.
Examples:
&device_type(server):
&device_type(GATEWAY):

user_type(type)
This function determines whether a user is an employee or third party. It takes a single parameter, the type, passed as text.
Examples:
&user_type(Employee):
&user_type(Third Party):

In addition to the above-described functions, embodiments of the present invention provide that new asset types and formula functions can be added in order to cover new organization assets or relationships as the need arises. This ensures that the risk management system of embodiments of the present invention can stay current as technology changes and as ongoing risk assessments determine focus is needed in other areas. The adaptability or extensibility of embodiments of the present invention is one of its strengths since it provides for the application of criteria now and for the foreseeable future.

To evaluate if a criterion is met, measurements made according to its corresponding metrics to determine if they are satisfied (true). A metric is considered satisfied (true) when there is an appropriate datapoint relationship to every asset that impacts that criterion. An appropriate metric is one that has at least the required verification method (as determined by the Minimum Verification Method of the Metric and the Verification Method of the DataPoint) and whose term has not expired (as determined by the current date, the Term of the Metric, and the Verification Date of the DataPoint).

It should be noted that as the organization changes (devices move or are added, become more critical, etc.) the applicability of metrics also adapts automatically via the evaluation of the formula. As these changes occur, criteria and metrics may change from satisfied (true) to unsatisfied (false)—thus providing true continuous evaluation for an organization. It also provides for continuous measurement of metrics as determined by the term. An example metric might be that "the alarm system has been tested in the last 30 days." Thus the term for that metric would be 30 days, and every thirty days the organization would have to re-test the alarms to ensure the metric was satisfied.

Once all metrics have been determined as satisfied or unsatisfied, the criterion can be evaluated. A criterion can also have a Metric Formula, which used to determine if the criterion is satisfied based upon whether its metrics are satisfied. Criteria formula (i.e., asset formula) can use any of the functions listed in Formula Guidelines section below—the usual case would be the "and, or" and "at least" functions. Again, any syntax can be used as long as it allows for a true/false evaluation based upon the true/false values of the associated metrics. In this implementation the simple functions of And, Or, and At Least are used. As a simple example, consider the Metric formula:

"?Metric1:*&AtLeast(2,?Metric2:,?Metric3:,?Metric4:)."

It may be evaluated to be true if Metric1 is true and two of Metric2, Metric3, and Metric4 are true. See the following table for some sample evaluations.

| Metric1 | Metric2 | Metric3 | Metric4 | Criteria |
|---------|---------|---------|---------|----------|
| True    | True    | False   | True    | True     |
| False   | True    | True    | True    | False    |
| True    | False   | True    | True    | True     |
| True    | False   | True    | False   | False    |

Formula Guidelines
Formula May Adhere to the Following Standards:
1. Elements of the formula that are metrics must be preceded by a '?'.
?metric_name:
2. Elements of the formula that are criteria must be preceded by a '/'.
/criteria_name:
3. Elements of the formula that are functions must be preceded by an '&'.
&function_name(parameters):
4. The '[' and ']' will be used as parenthesis. These can be used and nested just like normal parenthesis in mathematical equations.

[/criteria1:*[/criteria2:+/criteria3:]]*/criteria4:

Here, the inner most parenthesis are evaluated first—

[/criteria2:+/criteria3:]=true

Then, the next set of parenthesis are evaluated using the result of the inner most parentheses—

[/criteria1:*true]=true

Then, the remaining formula elements are evaluated along with the results of the parenthesis— true*/criteria4:=true

5. The logical operator 'or' will be represented by '+'.
/crit1: +/crit2:
6. The logical operator 'and' will be represented by '*'.
/crit1: * crit2:
7. All formula elements must be followed by a ':'. Elements inside parenthesis should be followed by a ':', but parenthesis should not.
[/crit1: * /crit2:]
8. The logical operator 'not' is represented by a function called '_not'.
&_not(/crit1:):

Examples:
[/crit1: * /crit2: * &function1(param1, param2, param3):]+ [/crit4: * /crit3:]
[?met1:+?met2:] * [?met3:+&function1(param1, parma2):]

Accordingly, embodiments of the present invention allow for criteria to be evaluated on a continuous basis, and monitored over time to ensure that risk is managed based upon established good practice embodied in the defined criteria and metrics. The criteria and metrics can also evolve to cover new risks via three methods: adding new criteria and metrics, modifying the Criteria Formula or Metric Formula, Term, Or Minimum Verification Method, and/or adding new assets types or relationships and applicable functions.

Figure 3:
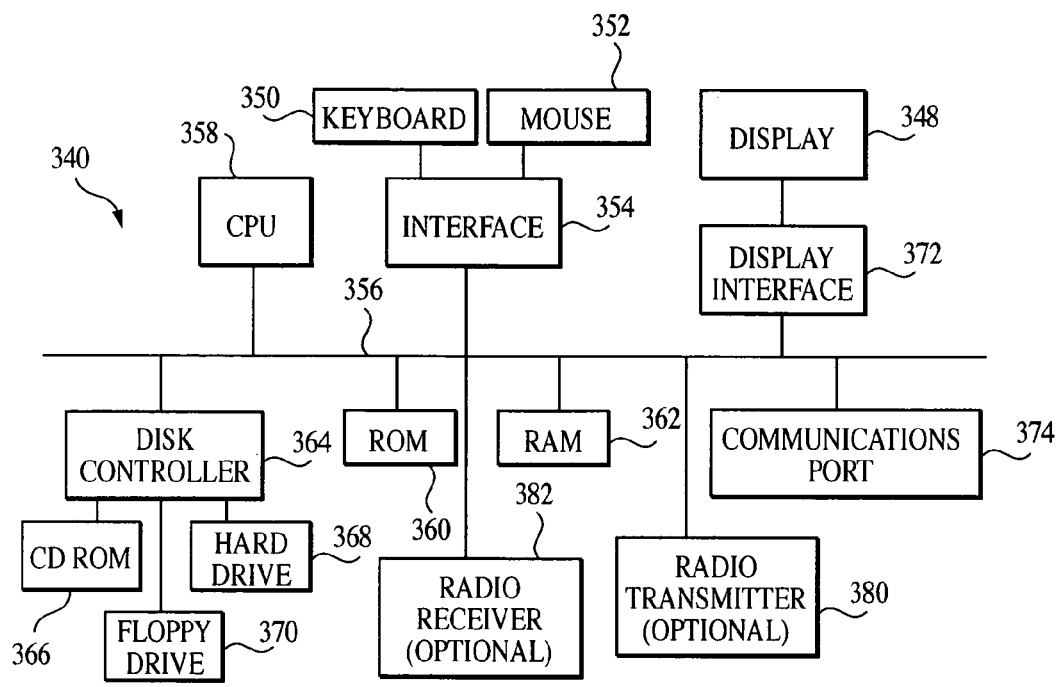
FIG. 3 is a block diagram illustrating various components of a computer configured to execute various features of embodiments of the present invention.

Now referring to FIG. 3 it illustrates a block diagram of one example of the internal hardware of a computer system 340 configured to execute embodiments of the present invention. A bus 356 serves as the main information highway interconnecting the other components of system 340. CPU 358 is the central processing unit of the system, performing calculations and logic operations required to execute the processes of embodiments of the present invention as well as other programs. Read only memory (ROM) 360 and random access memory (RAM) 362 constitute the main memory of the system. Disk controller 364 interfaces one or more disk drives to the system bus 356. These disk drives are, for example, floppy disk drives 370, or CD ROM or DVD (digital video disks) drives 366, or internal or external hard drives 368. These various disk drives and disk controllers are optional devices.

A display interface 372 interfaces display 348 and permits information from the bus 356 to be displayed on display 348. Display 348 may be used in displaying the user interface that allows the user to make links as described above. Communications with external devices such as the other components of the system described above, occur utilizing, for example, communication port 374. Optical fibers and/or electrical cables and/or conductors and/or optical communication (e.g., infrared, and the like) and/or wireless communication (e.g., radio frequency (RF), and the like) can be used as the transport medium between the external devices and communication port 374. Peripheral interface 354 interfaces the keyboard 350 and mouse 352, permitting input data to be transmitted to bus 356. In addition to these components, system 340 also optionally includes an infrared transmitter and/or infrared receiver. Infrared transmitters are optionally utilized when the computer system is used in conjunction with one or more of the processing components/stations that transmit/receive data via infrared signal transmission. Instead of utilizing an infrared transmitter or infrared receiver, the computer system may also optionally use a low power radio transmitter 380 and/or a low power radio receiver 382. The low power radio transmitter transmits the signal for reception by components of the production process, and receives signals from the components via the low power radio receiver. The low power radio transmitter and/or receiver are standard devices in industry.

Although system 340 in FIG. 3 is illustrated having a single processor, a single hard disk drive and a single local memory, the system 340 is optionally suitably equipped with any multitude or combination of processors or storage devices. For example, system 340 may be replaced by, or combined with, any suitable processing system operative in accordance with the principles of embodiments of the present invention, including sophisticated calculators, and hand-held, laptop/notebook, mini, mainframe and super computers, as well as processing system network combinations of the same.

Figure 4:
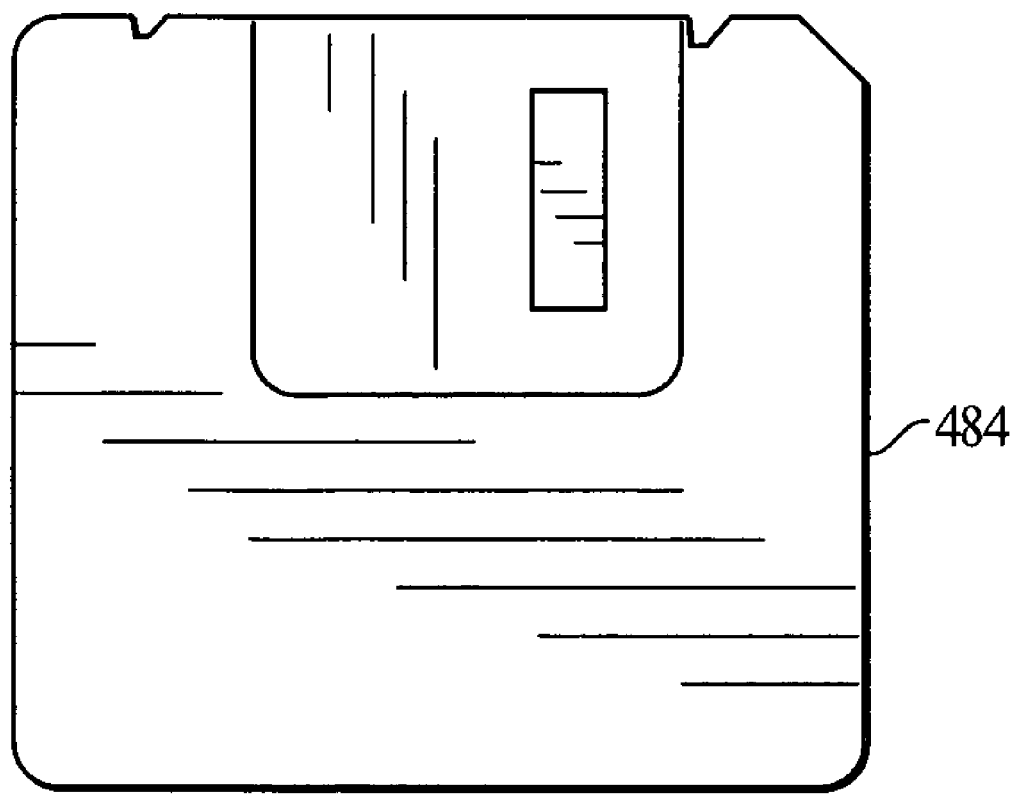
FIG. 4 is a diagram depicting a computer memory medium configured to store various forms of computer programs of embodiments of the present invention.

FIG. 4 is an illustration of an exemplary computer readable memory medium 484 utilizable for storing computer readable code or instructions. As one example, medium 484 may be used with disk drives illustrated in FIG. 3. Typically, memory media such as floppy disks, or a CD ROM, or a digital video disk may contain, for example, a multi-byte locale for a single byte language and the program information for controlling the above system to enable the computer to perform the functions described herein. Alternatively, ROM 360 and/or RAM 362 illustrated in FIG. 3 can also be used to store the program information that is used to instruct the central processing unit 358 to perform the operations associated with the instant processes. Other examples of suitable computer readable media for storing information include magnetic, electronic, or optical (including holographic) storage, some combination thereof, etc.

In general, it should be emphasized that the various components of embodiments of the present invention can be implemented in hardware, software or a combination thereof. In such embodiments, the various components and steps would be implemented in hardware and/or software to perform the functions of embodiments of the present invention. Any presently available or future developed computer software language and/or hardware components can be employed in such embodiments of the present invention. For example, at least some of the functionality mentioned above could be implemented using Visual Basic, C, C++, or any assembly language appropriate in view of the processor(s) being used. It could also be written in an interpretive environment such as Java and transported to multiple destinations to various users.

The many features and advantages of embodiments of the present invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for assessing and/or managing risks for an organization, comprising the steps of:
   inventorying a plurality of assets of the organization, wherein each asset is defined to be one of an electronic asset type and a location asset type, and wherein the electronic asset type includes computers and networking equipment therefor and the location asset type includes physical locations where the electronic asset types are placed;
   identifying the plurality of assets, wherein at least a portion of the plurality of assets are identified by utilizing a computer to electronically scan the plurality of assets via a network;
   storing the identified assets electronically in the computer;
   identifying at least one criterion defining a security objective of the organization, and electronically storing the at least one identified criterion in the computer;
   identifying one or more inventoried assets that relate to the identified criterion by utilizing the computer;
   formulating one or more metric equations for each identified criterion by utilizing the computer, each metric equation being defined, in part, by the one or more identified assets, wherein each metric equation yields an outcome value when one or more measurements are made relating to the identified assets; and
   assessing the risk to the organization based on the measured values of the one or more metric equations by utilizing the computer.

2. The method of claim 1, wherein the step of identifying the plurality of assets further comprises at least one of:
   interviewing members of the organization to identify the plurality of assets; and
   manually identifying the plurality of assets.

3. The method of claim 1, wherein the plurality of assets are defined to be one of a user type, a user population type, a data type and a network type in addition to the electronic type and the location type, wherein the user type relates to an individual user and the user population type relates to a group of users.

4. The method of claim 3, further comprising the step of:
   establishing at least one relationship between the plurality of assets.

5. The method of claim 4, wherein the step of establishing the at least one relationship further comprises the step of:
   linking a first asset defined to be in one asset type with a second asset defined to be in another asset type.

6. The method of claim 4, wherein the step of establishing the at least one relationship further comprises the step of:
   linking a first asset defined to be in one asset type with a second asset defined to be in the same asset type.

7. The method of claim 4, wherein the step of identifying one or more inventoried assets further comprises the step of:
   identifying one or more inventoried assets that relate to the identified criterion based on the at least one established relationship between the plurality of assets.

8. A computing system configured to:
   identify a plurality of assets of the organization, wherein each asset is defined to be one of an electronic asset type and a location asset type, wherein the electronic asset type includes computers and networking equipment therefore and the location asset type includes physical locations where the electronic asset types are placed, and store the identified assets into a database;
   identify a plurality of criteria, each criterion defining a security objective of the organization;
   identify a plurality of inventoried assets that relate to each identified criterion; and
   formulate one or more metric equations for each identified criterion, each metric equation being defined, in part, by the one or more identified assets, wherein each metric equation yields an outcome value when one or more measurements are made relating to the identified assets, thereby allowing a user to assess the risk to the organization based on the measured values of the one or more metric equations.

9. The computing system of claim 8, further configured to identify the plurality of assets by electronically scanning at least a portion of the plurality of assets via a network.

10. The computing system of claim 8, wherein the plurality of assets are defined to be one of a user type, a user population type, a data type and a network type in addition to the electronic type and the location type, wherein the user type relates to an individual user and the user population type relates to a group of users.

11. The computing system of claim 10, further configured to establish at least one relationship between the plurality of assets.

12. The computing system of claim 11, further configured to establish the at least one relationship by linking a first asset defined to be in one asset type with a second asset defined to be in another asset type.

13. The computing system of claim 11, further configured to establish the at least one relationship by linking a first defined to be in one asset type with a second asset defined to be in the same asset type.

14. The computing system of claim 11, further configured to identify one or more inventoried assets that relate to the identified criterion based on the at least one established relationship between the plurality of assets.

15. A system for assessing and/or managing risks for an organization, comprising:
   a computer configured to identify a plurality of assets of the organization, wherein each asset is defined to be one of an electronic asset type and a location asset type, and wherein the electronic asset type includes computers and networking equipment therefor and the location asset type includes physical locations where the electronic asset types are placed;

a database configured to store the identified assets along with their asset types;

means for identifying at least one criterion defining a security objective of the organization, wherein the computer is further configured to identify one or more inventoried assets that relate to the identified criterion and configured to formulate one or more metric equations for each identified criterion, each metric equation being defined, in part, by the one or more identified assets, wherein each metric equation yields an outcome value when one or more measurements are made relating to the identified assets, thereby allowing a user to assess the risk to the organization based on the measured values of the one or more metric equations.

16. The system of claim 15, wherein the computer is further configured to:
electronically scan the plurality of assets;
interview members of the organization to identify the plurality of assets; and
manually identify the plurality of assets.

17. The system of claim 15, wherein the plurality of assets are defined to be one of a user type, a user population type, a data type and a network type in addition to the electronic type and the location type, wherein the user type relates to an individual user and the user population type relates to a group of users.

18. The system of claim 17, wherein the computer is further configured to establish at least one relationship between the plurality of assets.

19. The system of claim 18, wherein the computer is further configured to link a first asset defined to be in one asset type with a second asset defined to be in another asset type.

20. The system of claim 18, wherein the computer is further configured to link a first asset defined to be in one asset type with a second asset defined to be in the same asset type.

21. The system of claim 18, wherein the computer is further configured to identify one or more inventoried assets that relate to the identified criterion based on the at least one established relationship between the plurality of assets.

22. A computer readable medium including instructions being executed by one or more computers, the instructions instructing the one or more computers for assessing and/or managing risks for an organization, the instructions comprising implementation of the steps of:
(a) inventorying a plurality of assets of the organization, wherein each asset is defined to be one of an electronic asset type and a location asset type, and wherein the electronic asset type includes computers and networking equipment therefor and the location asset type includes physical locations where the electronic asset types are placed;
(b) identifying at least one criterion defining a security objective of the organization;
(c) identifying one or more inventoried assets that relate to the identified criterion; and
(d) formulating one or more metric equations for each identified criterion, each metric equation being defined, in part, by the one or more identified assets, wherein each metric equation yields an outcome value when one or more measurements are made relating to the identified assets, thereby allowing a user to assess the risk to the organization based on the measured values of the one or more metric equations.

23. The medium of claim 22, wherein the step (a) comprises the step of:
identifying the plurality of assets and storing the identified assets into a database.

24. The medium of claim 23, wherein the step of identifying the plurality of assets comprises at least one of:
electronically scanning the plurality of assets;
interviewing members of the organization to identify the plurality of assets; and
manually identifying the plurality of assets.

25. The medium of claim 22, wherein the plurality of assets are defined to be one of a user type, a user population type, a data type and a network type in addition to the electronic type and the location type, wherein the user type relates to an individual user and the user population type relates to a group of users.

26. The medium of claim 25, further comprising the step of:
establishing at least one relationship between the plurality of assets.

27. The medium of claim 26, wherein the step of establishing the at least one relationship further comprises the step of:
linking a first asset defined to be in one asset type with a second asset defined to be in another asset type.

28. The medium of claim 26, wherein the step of establishing the at least one relationship further comprises the step of:
linking a first asset defined to be in one asset type with a second asset defined to be in the same asset type.

29. The medium of claim 26, wherein the step (c) further comprises the step of:
identifying one or more inventoried assets that relate to the identified criterion based on the at least one established relationship between the plurality of assets.

* * * * *